US008396661B2

(12) United States Patent
Wong et al.

(10) Patent No.: US 8,396,661 B2
(45) Date of Patent: Mar. 12, 2013

(54) USING RELATIVE POSITION DATA IN A MOBILE COMPUTING DEVICE

(75) Inventors: Kean Wong, Redwood City, CA (US); Adam Fineberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 12/694,117

(22) Filed: Jan. 26, 2010

(65) Prior Publication Data

US 2011/0184646 A1 Jul. 28, 2011

(51) Int. Cl.
*G01C 21/00* (2006.01)
(52) U.S. Cl. ........................ 701/472; 701/300
(58) Field of Classification Search .......... 701/408–462, 701/500–505, 300–302
See application file for complete search history.

(56) References Cited

U.S. PATENT DOCUMENTS

| | | | | |
|---|---|---|---|---|
| 6,853,909 | B2 * | 2/2005 | Scherzinger | 701/472 |
| 6,898,434 | B2 * | 5/2005 | Pradhan et al. | 455/456.1 |
| 7,162,367 | B2 * | 1/2007 | Lin et al. | 701/472 |
| 8,195,343 | B2 * | 6/2012 | Lin | 701/2 |
| 8,244,462 | B1 * | 8/2012 | Zhu | 701/408 |
| 2006/0075442 | A1 * | 4/2006 | Meadow | 725/91 |
| 2006/0259574 | A1 * | 11/2006 | Rosenberg | 709/217 |
| 2011/0032105 | A1 * | 2/2011 | Hoffman et al. | 340/573.1 |

* cited by examiner

Primary Examiner — Richard M. Camby (57) ABSTRACT

A mobile computing device comprises a relative position determination circuit, a position determination circuit, and a processing circuit. The relative position determination circuit is configured to provide relative position data from a first position of the mobile computing device to a second position of the mobile computing device. The position determination circuit is configured to provide position data representing the second geographic position of the mobile computing device. The processing circuit is configured to generate position data for the first position based on the relative position data and the position data.

14 Claims, 4 Drawing Sheets

USING RELATIVE POSITION DATA IN A MOBILE COMPUTING DEVICE

BACKGROUND

Some mobile computing devices provide location-based services to a user. For example, a mobile computing device may use a navigation application to provide directions from the user's current location to a desired destination. A position determining circuit or system may be used to periodically determine the position of the mobile computing device.

DETAILED DESCRIPTION

Some embodiments described herein can record the location of an event, such as the taking of a digital image, with greater accuracy. Some embodiments can record the location of an event with greater accuracy even when a high accuracy absolute positioning system is not available at the time of the event. Some embodiments can record the location of an event in a building, parking garage, tunnel, or other enclosed space even when signals for an absolute positioning system are unavailable. Some embodiments can provide for deferred geotagging, allowing a user to geotag an event some period of time after the mobile device has moved on from the location of the event. Geotagging may refer to a process of attaching position data, such as absolute position data, to a digital photograph, for example, by storing the position data in a data file associated with the digital photograph.

Referring to FIGS. 1-4, a mobile device 10 is shown. The teachings herein can be applied to device 10 or to other electronic devices (e.g., a desktop computer), such as mobile computing devices (e.g., a laptop computer) or handheld computing devices, such as a personal digital assistant (PDA), smartphone, mobile telephone, personal navigation device, handheld digital camera, etc. According to one embodiment, device 10 may be a smartphone, which is a combination mobile telephone and handheld computer having PDA functionality. PDA functionality can comprise one or more personal information management applications (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download (such as from an "application store" operable on remote server computers), SecureDigital card, etc.

As shown in FIGS. 1-4, device 10 includes a housing 12 and a front 14 and a back 16. Device 10 further comprises a display 18 and a user input device 20 (e.g., a QWERTY keyboard, buttons, touch screen, microphone for speech recognition engine, etc.). Display 18 may comprise a touch screen display in order to provide user input to a processor 102 (see FIG. 5) to control functions, such as to select options displayed on display 18, enter text input to device 10, or enter other types of input. Display 18 also provides images (e.g., a geographic map, application icons, a web browser, etc.) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on. One or more indicator areas 38 (e.g., lights, etc.) may be provided to indicate that a gesture has been received from a user.

According to an exemplary embodiment, housing 12 is configured to hold a screen such as display 18 in a fixed or movable (e.g., slidable, rotatable, hinged, etc.) relationship above a user input device such as user input device 20 in a substantially parallel or same plane, or in a different plane. This fixed relationship excludes a hinged or movable relationship between the screen and the user input device (e.g., a plurality of keys) in the fixed embodiment.

Figure 1:
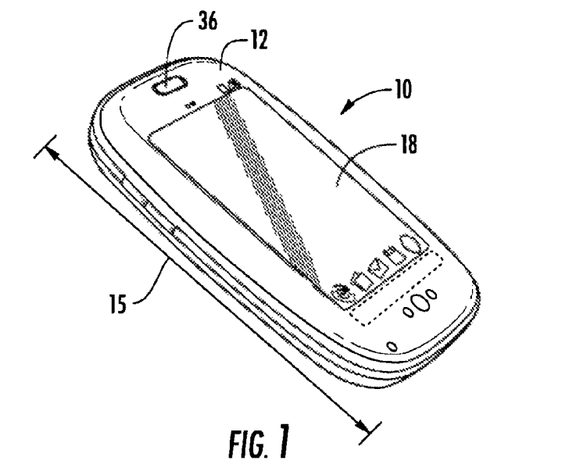
FIG. 1 is a perspective view of a mobile computing device according to an exemplary embodiment.
Figure 2:
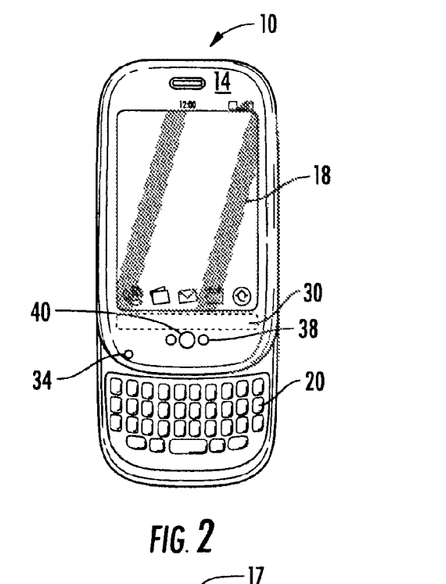
FIG. 2 is a front view of the mobile computing device of FIG. 1 in an extended configuration according to an exemplary embodiment.
Figure 3:
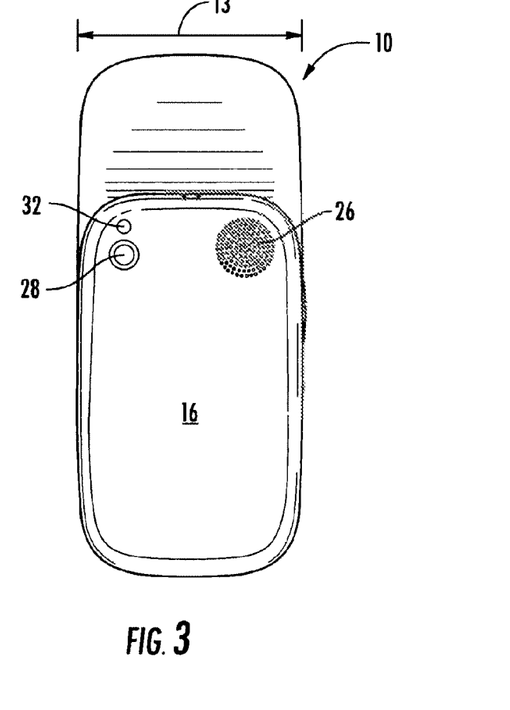
FIG. 3 is a back view of the mobile computing device of FIG. 1 in an extended configuration according to an exemplary embodiment.
Figure 4:
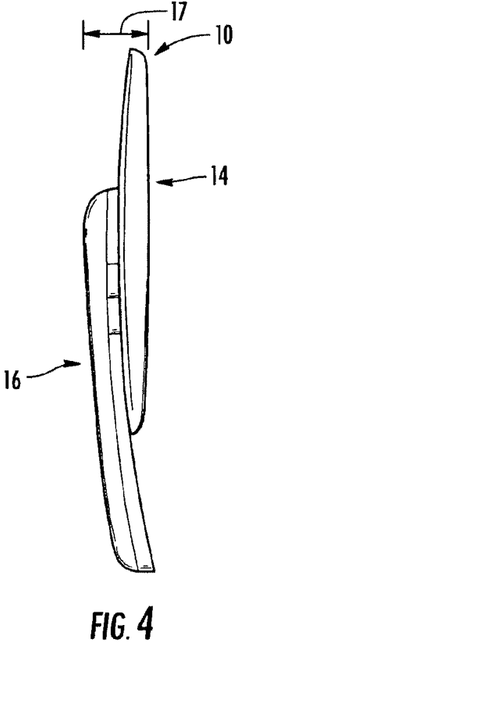
FIG. 4 is a side view of the mobile computing device of FIG. 1 in an extended configuration according to an exemplary embodiment.

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 2, the rear surface shown in FIG. 3, the side surfaces as shown in FIG. 4, etc.). Furthermore, various components such as a keyboard etc. may be retractable to slide in and out from a portion of device 10 to be revealed along any of the sides of device 10, etc. For example, as shown in FIGS. 2-4, front 14 may be slidably adjustable relative to back 16 to reveal input device 20, such that in a retracted configuration (see FIG. 1) input device 20 is not visible, and in an extended configuration (see FIGS. 2-4) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 5:
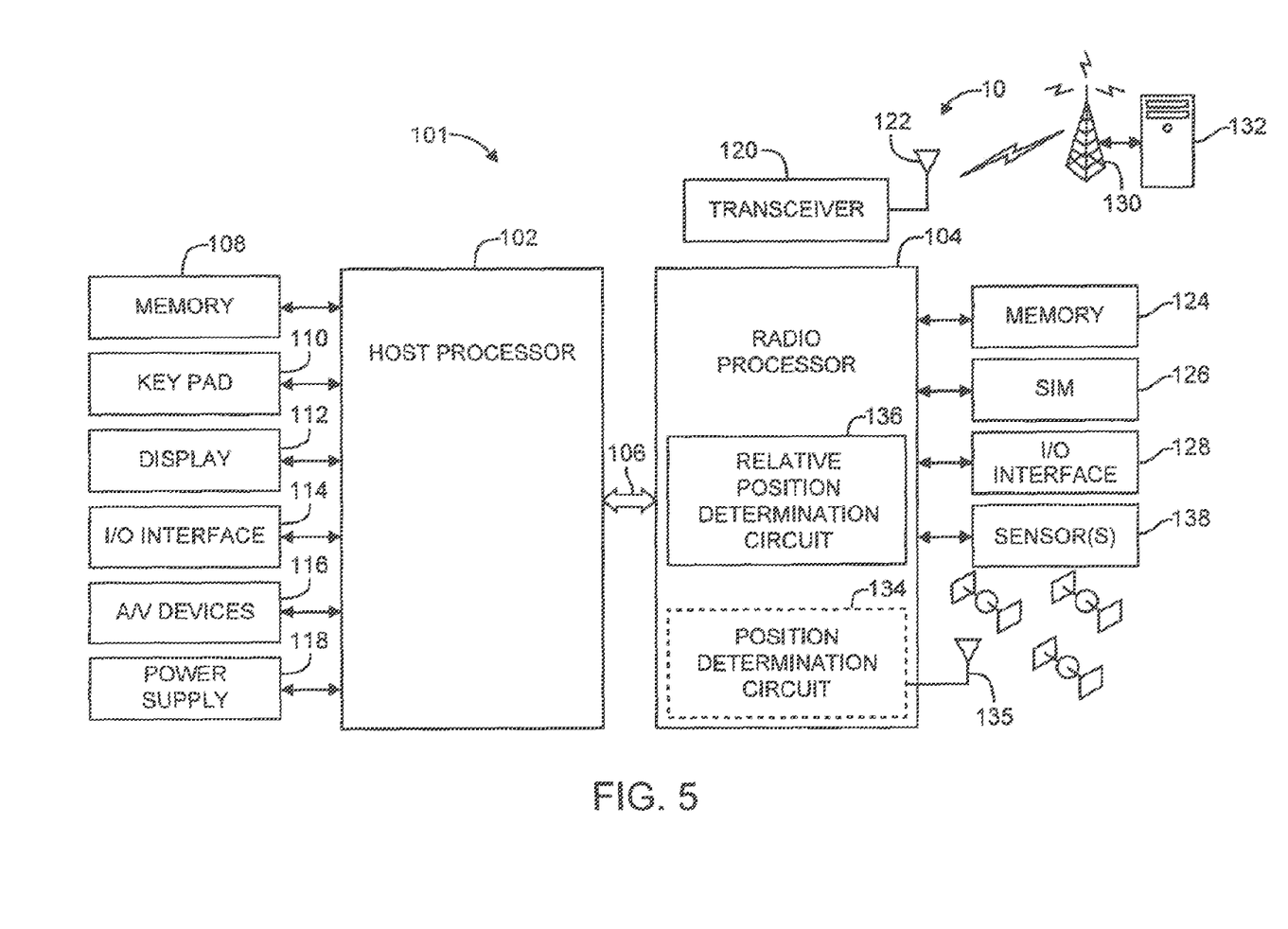
FIG. 5 is a block diagram of the mobile computing device of FIG. 1 according to an exemplary embodiment.

As shown in the embodiment of FIG. 5, device 10 may comprise a processing circuit 101 having a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of the computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 10 may utilize any suitable OS in accordance with the described embodiments such as a Palm webOS, Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 10 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EE- PROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support A/V capability of device 10. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more position determination techniques including, for example, Global Positioning System (GPS) techniques (or Galileo, GLONASS, etc.), Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFLT) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 10 may be configured to operate in one or more position determination modes including, for example, an autonomous mode, a standalone mode, a mobile station (MS) assisted mode, and/or a MS-based mode. In an autonomous mode, device 10 is configured to determine its position using a position determination circuit (e.g., a GPS receiver) without the assistance of signals from a wireless network. In a standalone mode, such as a standalone GPS mode, device 10 may be configured to determine its position without receiving wireless navigation data from the network, though it may receive certain types of position assist data, such as almanac, ephemeris, and coarse data. In a standalone mode, device 10 may comprise a local position determination circuit 134 (e.g., a GPS receiver) which may be integrated within housing 12 (FIG. 1) configured to receive satellite data via an antenna 135 and to calculate a position fix. Local position determination circuit may alternatively comprise a GPS receiver in a second housing separate from housing 12 but in the vicinity of device 10 and configured to communicate with device 10 wirelessly (e.g., via a PAN, such as Bluetooth). When operating in an MS-assisted mode or an MS-based mode, however, device 10 may be configured to communicate over a radio access network 130 (e.g., UMTS radio access network) with a remote computer 132 (e.g., a position determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 10 may be configured to determine its position using acquisition data or other wireless data from the remote computer 132. The acquisition data may be provided periodically. In various implementations, device 10 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system or a comparable standard for GSM systems.

When assisting the mobile computing device 10, the remote computer 132 may handle various processing operations and also may provide information to aid position determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, Wide Area Augmentation System (WAAS), Multi-Funtional Satellite Augmentation System (MSAS), Local-Area Augmentation System (LAAS), etc.

In various implementations, the position assist data provided by the remote computer 132 may improve the speed of satellite acquisition and the probability of a position fix by concentrating the search for a GPS signal and/or may improve the accuracy of position determination. Each position fix or series of position fixes may be available at device 10 and/or at the remote computer 132 depending on the position determination mode. In some cases, data calls may be made and position assist data may be sent to device 10 from the remote computer 132 for every position fix (e.g., in an ad hoc mode). In other cases, data calls may be made and position assist data may be sent periodically and/or as needed.

In various embodiments, device 10 may comprise dedicated hardware circuits or structures, or a combination of dedicated hardware and associated software, to support position determination. For example, the transceiver module 120 and the antenna system 122 may comprise GPS receiver or transceiver hardware and one or more associated antennas coupled to the radio processor 104 to support position determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 10 or from a source external to device 10. For example, the user of device 10 may interact with a data input device to command the LBS application to send a location request. The LBS application also may send a location request in response to receiving input from an external network element or computing device that is attempting to locate the user of device 10. In some cases, the LBS application also may be configured to automatically, periodically, and/or autonomously send location requests.

Although other applications may operate without regard to the location of device 10, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the position determination process. Examples of configuration parameters may include, without limitation, position determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide position determination capabilities for device 10. In some embodiments, the position engine may be implemented as software operating in conjunction with hardware (e.g., GPS receiver hardware) allowing device 10 to receive and process GPS satellites signals for position determination. In one embodiment, the position engine may be implemented as a QUALCOMM® gpsOne® engine.

In various implementations, the position engine may employ one or more position determination techniques such as GPS, CGI, CGI+TA, EFLT, TDOA, AOA, AFLT, OTDOA, EOTD, AGPS, GPS/AGPS, hybrid techniques, and so forth. The position engine also may be configured to operate in one or more position determination modes including a standalone mode, an MS-assisted mode, and an MS-based mode. The determined position information generated and/or obtained by the position engine generally may comprise any type of information associated with the location of device 10. Examples of position information may include, without limitation, current location, latitude, longitude, altitude, heading information, vector information such as horizontal and vertical velocity, sector-based position location, position fix information, position uncertainty, device orientation, and so forth.

Referring again to FIG. 5, processing circuit 101 may comprise a relative position determination circuit 136, shown in exemplary form as a part of the radio processor 104, though circuit 136 may be part of host processor 102 or any other portion of processing circuit 101. The relative position determination circuit may comprise circuitry and/or software configured to provide relative position data for device 10. Circuit 136 may be coupled to one or more sensors 138, such as a compass, accelerometer, gyroscope, altimeter, etc. The sensors 138 may comprise any sensors used for dead reckoning navigation. The compass may comprise magneto-inductive, magneto-resistive, or other magnetic field sensing technologies, and may be in the form of discrete components or solid state devices. One or more of sensors 138 may be in the form of microelectromechanical machines (MEMS) or nanoelectromechanical machines (NEMS).

Relative Position Algorithm

Figure 6:
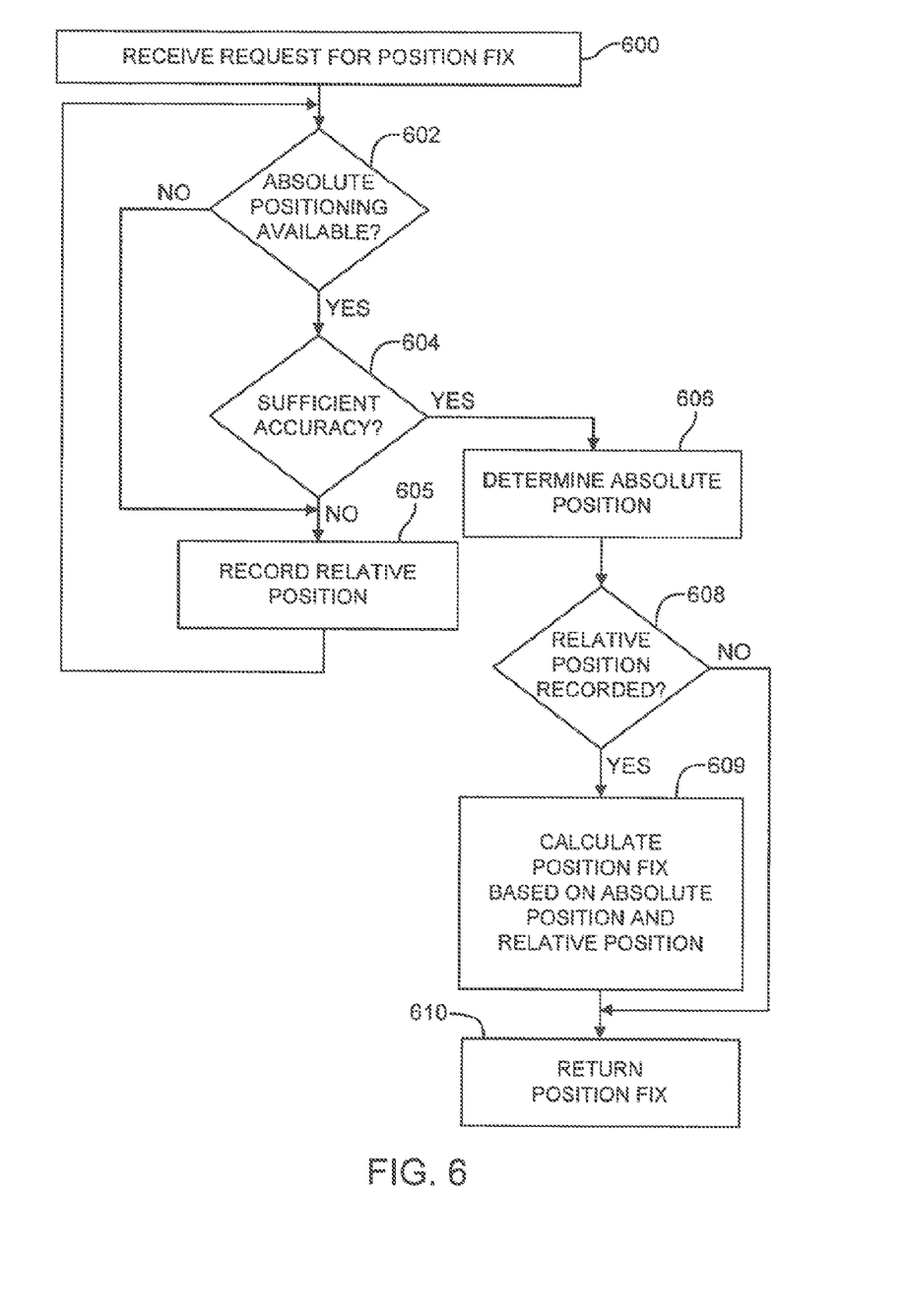
FIG. 6 is a flowchart of a method of using a mobile computing device according to an exemplary embodiment.

Referring now to FIG. 6, an algorithm for using relative position in a mobile computing device will be described. At a step 600, processing circuit 101 is configured to receive a request for a position fix. The request can be received from one or more applications operable on processing circuit 101 or from a source external to device 10, and the request can be received in response to an input signal received from a user input device or without requiring user input. In one exemplary embodiment, processing circuit 101 may receive the request for a position fix in response to user of device 10 pressing a button to acquire a digital picture or other digital image data (video, etc.).

At a step 602, processing circuit 101 is configured to determine whether position data is available. Absolute position data can refer to position data which is not relative position data, and may include latitude/longitude and/or altitude with any of a variety of formats or accuracies expressed in degrees or distance. For example, if device 10 has lost line-of-sight with global positioning system satellites, absolute position data may be unavailable. As another example, if device 10 is out of range of a cellular signal and is using a position determining technique that relies on signals from the cellular signal, absolute position data may be unavailable. If absolute positioning is available, at a step 604 processing circuit 101 may optionally be configured to determine whether absolute positioning is available with sufficient accuracy. Circuit 101 may be configured to compare the accuracy available from the one or more available position determination techniques with a predetermined or prestored required accuracy, which may be set by the application requesting the position fix, by a user, etc. If absolute position data is available with at least the predetermined or sufficient accuracy, the absolute position is determined using one of the available and qualifying techniques (at step 606) and, if relative position data was not needed or determined (step 608), the absolute position is returned as the position fix to the application, process, or device requesting the position fix (step 610).

Device 10 may be configured to provide position fixes using one or more types of absolute positioning circuits or methods. Any of the methods described herein may be used, such as the global positioning system. A Wi-Fi Positioning System may be used as another type of absolute positioning system, such as one provided by Skyhook Wireless, Inc., Boston, Mass. For example, an absolute positioning circuit may be configured to collect Wi-Fi identifier data from a plurality of nearby Wi-Fi access points (e.g., any wireless transceiver communicating according to an IEEE 802.11x protocol) and retrieve a latitude/longitude or other absolute position from a database by looking up the Wi-Fi access point identifiers received in the position of interest. In another example, a Wi-Fi access point may be configured to transmit its absolute position and device 10 may be configured to determine that its absolute position is the position of the Wi-Fi access point, within a predetermined error. Another type of absolute positioning system having less accuracy than GPS is a Cell-ID triangulation positioning system, such as one provided by Telmap, Ltd., London, United Kingdom.

If processing circuit 101 determines that absolute position data having a predetermined accuracy is not available, processing circuit 101 is configured to store, determine, record, track or generate relative position data at a step 605. For example, processing circuit 101 may be configured to begin tracking the movement of device 10 using one or more of sensors 138 from a first position to subsequent positions. The movement of device 10 may be stored as relative position data in a memory until absolute positioning data or absolute positioning data of a sufficient accuracy are available. When such data is available, the absolute position is determined at step 606 and, because relative position data has been recorded or stored, etc., at step 605, at step 608 the processing circuit is configured to continue to step 609 to generate a position fix based on the absolute position data and relative position data. This generated position fix represents an approximate position for the position fix (for example, an approximate position at which a digital image was captured or acquired). The position fix may then be stored along with a digital image file, for example as .EXIF data or other metadata associated with the acquired digital image.

Relative position determination circuit 136 may further be configured to receive geographic or map data from a geographic information database and generate the relative position based on this map data in addition to the data from sensors 138. A map matching algorithm may be operable as part of circuit 136 to provide more accurate relative position data. For example, if the path of device 10 is detected by circuit 136 to be following mapped streets, paths, hallways, etc., map matching could be employed to add a constraint to the path of relative position data being recorded.

Another method of providing an absolute position fix is for device 10 to look up the position of the device in a database when a certain action is taken with device 10; for example, a database of images having known locations can be used by device 10 to look up its current location as the camera of device 10 captures the same image. In one example, a database contains an image of the Mona Lisa along with latitude/longitude/altitude data for the location of the Mona Lisa. Device 10 captures an image of the Mona Lisa, and a local or server-based program compares the captured image to images in the database using an image recognition algorithm; if a match is found, device 10 assumes its absolute position at the time of the image capture is the position of the Mona Lisa. This absolute position may then be used as described herein to find a first position using prestored relative position data.

Exemplary Scenario/Schematic Diagram

Figure 7:
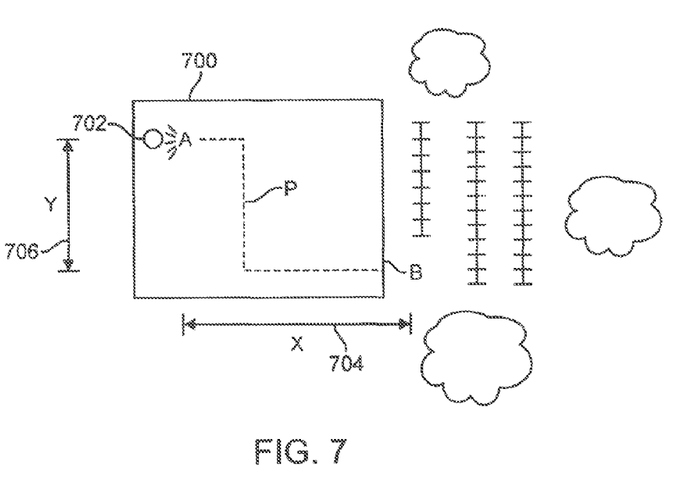
FIG. 7 is a schematic diagram of an environment used to illustrate an exemplary embodiment.

Referring now to FIG. 7, a schematic diagram will be used to demonstrate an exemplary scenario for use of the system and method described herein. A user of a mobile device is within an enclosed building 700 at a point A and captures an image of an object 702. In response to the image capture, device 10 processes a request for a position fix from a camera application or other process. Device 10 may be configured to determine whether an absolute position fix is available. If no absolute position fix is currently available, device 10 is configured to start tracking the movement of device 10 so as to record a relative position of device 10 which is relative to point A. The movement may be tracked by using a dead reckoning system or other relative position determination circuit (compass, accelerometer and gyroscope typically) with high accuracy. The exemplary system and method allows the user to move on from point A without having to wait for an absolute position fix to be calculated.

As device 10 moves along path P, the relative position determination circuit is configured to continuously record, update, generate, or calculate the relative position of device 10 to point A. Device 10 is further configured to simultaneously or intermittently use an absolute positioning system (e.g., GPS, Wi-Fi, cell I.D., etc.) to try to get an absolute position fix or an absolute position fix having greater than a predetermined accuracy. Along path P, device 10 is within an enclosed building and therefore GPS satellite signals are unavailable. Assuming Wi-Fi and cellular positioning signals are also unavailable or device 10 is not configured to determine an absolute position using these technologies, device 10 continues to record the relative position of device 10 in memory until point B outside of building 700, at which GPS signals are available and absolute position data may be generated.

When absolute position data is available at point B, device 10 is configured to use the absolute position data and the recorded relative position data to correlate back from position B to position A where the photo was captured. In FIG. 7, the relative movement is represented as a change in an x direction 704 and a change in a y direction 706. In another embodiment, a change in a z direction (altitude) may also be recorded in memory and used in the calculation of the position fix. The calculated position A (which may be expressed in latitude/longitude and/or altitude, or another geographic coordinate system) may then be stored by device 10, along with digital image data representing the captured image, as metadata.

According to another exemplary embodiment, one type of absolute positioning signal may be available within building 700 while a second type of absolute positioning signal used to generate a higher accuracy position fix than the first type is available outside of building 700. In this example, device 10 may be configured to generate and store a first position fix using the first absolute positioning signals at the time of image capture (at point A). The position fix may be tagged or associated with the digital image file in memory. Then device 10 may be configured to use the relative position determination circuit to track movement of device 10 and record the relative position data. If positioning signals from the second type or other type of absolute positioning system having a higher accuracy then become available to device 10, device 10 may be configured to updated the location information tagged to the picture using the first type of absolute positioning system with the more accurate information.

Initialization Calibration

The relative position determination circuit 136 may be configured in any of a number of ways to calculate relative position data and/or reference position data. According to one example, an initial or first reference position may be generated based on GPS, Wi-Fi, or other absolute positioning technologies. For example, placing device 10 on or near a battery charging module (such as the Palm Touchstone charging module) may allow device 10 to calculate its position using GPS, Wi-Fi, etc. and use the known position when device 10 is subsequently placed on or near the charging module as a reference position. The reference position can then be used to calculate relative position data for the relative position determination circuit 136. As another example, modules may be placed at the entrances of buildings or at other locations which communicate wirelessly with device 10 to cause device 10 to calculate its absolute location and/or to begin calculating relative position. The modules may send positioning information to the device 10 and/or may cause device 10 to calculate an absolute position fix.

Exemplary Applications

As described above, one scenario for the embodiments described herein is for use with geotagging. Another scenario is to use the embodiments described herein to provide useful navigation instructions to a user when moving around within a building, such as a shopping mall, conference center, etc.

Another set of scenarios for use of the embodiments described herein include any scenario in which a user does not need to know the absolute position of an event occurring at or on the device until a time after the device has moved on from the position. For example, when a user wishes to find their way back to a parked car in a parking structure (e.g., in a below-ground parking structure), the described embodiments may be used. In this scenario, device 10 is configured to begin tracking relative position when the device is at or near the parked car (in response to a user input such as by tapping on a touch screen of device 10, in response to device 10 detecting it is moving away from the vehicle (e.g., by detecting the loss of a Bluetooth or other wireless communication link with the vehicle), or in response to other inputs.

In another embodiment, device 10 may be configured to identify and store the location of a meeting for use in a diary application, a calendar application, or other another application. Device 10 may be configured to determine that a calendar appointment has been entered in a calendar application and that the time has come for the appointment to take place. Device 10 may be configured to begin tracking relative position while the user is in the meeting. Then when device 10 leaves the meeting and moves to a place where absolute positioning or more accurate absolute positioning is available, device 10 may be configured to calculate the relative position to the point where tracking began in order to find the absolute position of the meeting or calendar appointment. The absolute position can then be tagged or attached to the calendar appointment in memory for later reference. The absolute position can also be used to look up a name or point of interest for the location (e.g., Hilton Hotel, Chicago, Ill., etc.) and the name of the location can be stored in the calendar appointment to provide more useful data to the user.

In another embodiment, device 10 can be configured to determine and store the position that device 10 was at when a phone call was received and/or ended. In this embodiment, when a phone call is received or made using device 10, and/or when a phone call ends, device 10 is configured to begin tracking a relative position of device 10. When absolute positioning or absolute positioning having an improved accuracy is available, device 10 is configured to calculate the absolute position of device 10 at the time the phone call was received, made, and/or ended.

According to another advantageous aspect, device 10 may be configured after obtaining absolute position data or an absolute position having improved accuracy to update or edit a database of Wi-Fi access points used for position determination, whether stored on device 10 or on a remote server. In this way, an improved Wi-Fi access point database may be generated using position data generated as device 10 moves about an environment.

Device 10 may be configured to begin relative position tracking, generation, or storage in response to any of a variety of trigger events, whether received from user input, received from an application operating on device 10, or received from a remote computer over a wireless communication link with device 10 (such as from another mobile device or from a remote server computer).

In another embodiment, device 10 may be configured to operate an exercise or hiking program configured to record a route, distance, speed, etc. of a user walking, running, or hiking with device 10. As device 10 loses absolute positioning data (e.g., when entering a tunnel), device 10 is configured to track position using the relative position data, until absolute positioning data is again available.

In another embodiment, device 10 may be configured to operate a price comparison or shopping program. While inside a store, device 10 may receive user input comprising data about a product (e.g., via typing on a keyboard, scanning with a camera, etc.). This collection of data can act as a trigger event to begin tracking relative position, until such time as absolute position data comes available. When absolute position data is available, device 10 may be configured to calculate and store a position at which device 10 collected the data and store data associated with that position (e.g., the name of the store obtained from a database of geographic information, latitude/longitude, etc.) with the inputted product data.

Various embodiments disclosed herein may include or be implemented in connection with computer-readable media configured to store machine-executable instructions therein, and/or one or more modules, circuits, units, or other elements that may comprise analog and/or digital circuit components (e.g. a processor or other processing circuit) configured or arranged to perform one or more of the steps recited herein. By way of example, computer-readable media may include RAM, ROM, CD-ROM, or other optical disk storage, magnetic disk storage, flash memory, or any other medium capable of storing and providing access to desired machine-executable instructions. The use of circuit or module herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A mobile computing device comprising:
   a relative position determination circuit configured to provide relative position data corresponding to a first position of the mobile computing device and a second position of the mobile computing device, wherein the first position is unknown and the second position is known;
   a position determination circuit configured to provide position data representing the second position of the mobile computing device; and
   a processing circuit configured to generate position data for the first position based on tracking movement of the mobile computing device from the first position to the second position.

2. The mobile computing device of claim 1, wherein the processing circuit is configured to operate a telephony application.

3. The mobile computing device of claim 1, wherein the relative position determination circuit comprises at least one of a compass, an accelerometer, or a gyroscope.

4. The mobile computing device of claim 3, wherein the relative position determination circuit comprises a compass, an accelerometer, and a. gyroscope.

5. The mobile computing device of claim 1, wherein the position determination circuit is configured to provide position data based on data from a global positioning system.

6. The mobile computing device of claim 1, wherein the position determination circuit is configured to provide position data based on data from a Wi-Fi access point.

7. The mobile computing device of claim 1, further comprising a camera, and wherein the position data for the first position represents a position at which the camera captured digital image data.

8. The mobile computing device of claim 1, further comprising a camera, and wherein the position data is derived from image recognition of an image captured by the camera.

9. The mobile computing device of claim 1, wherein the processing circuit is configured to generate the position data for the first position based on the relative position data when position data is not available from the position determination circuit at a desired time.

10. The mobile computing device of claim 1, wherein the processing circuit is configured to generate the position data for the first position based on the relative position data when position data having a predetermined sufficient accuracy is not available from the position determination circuit at a desired time.

11. The mobile computing device of claim 9, further comprising, a camera, and wherein the desired time is a time a picture or video is taken with a camera.

12. The mobile computing device of claim 1, further comprising a camera, and wherein the processing circuit is configured to store, in a memory resource, the position data for the first position as metadata along with a digital image captured by the camera at approximately the first position.

13. The mobile computing device of claim 1, wherein the processing circuit is configured to initiate storage of the relative position data in a memory resource without requiring a user input.

14. The mobile computing device of claim 1, wherein the relative position determination circuit is configured to receive geographic information from a geographic information database and to generate the relative position data based at least in part on the geographic information.

* * * * *

UNITED STATES PATENT AND TRADEMARK OFFICE
CERTIFICATE OF CORRECTION

PATENT NO. : 8,396,661 B2
APPLICATION NO. : 12/694117
DATED : March 12, 2013
INVENTOR(S) : Kean Wong et al.

It is certified that error appears in the above-identified patent and that said Letters Patent is hereby corrected as shown below:

In the Claims:

In column 15, line 6, in Claim 4, delete "a." an insert -- a --, therefor.

In column 16, lines 7-8, in Claim 11, delete "comprising," and insert -- comprising --, therefor.

Signed and Sealed this
Third Day of September, 2013

Teresa Stanek Rea
*Acting Director of the United States Patent and Trademark Office*